Nov. 23, 1954  B. G. KLUGH ET AL  2,695,221
METHOD FOR FORMING AGGREGATES FROM AQUEOUS ORE SLURRIES
Filed May 26, 1950
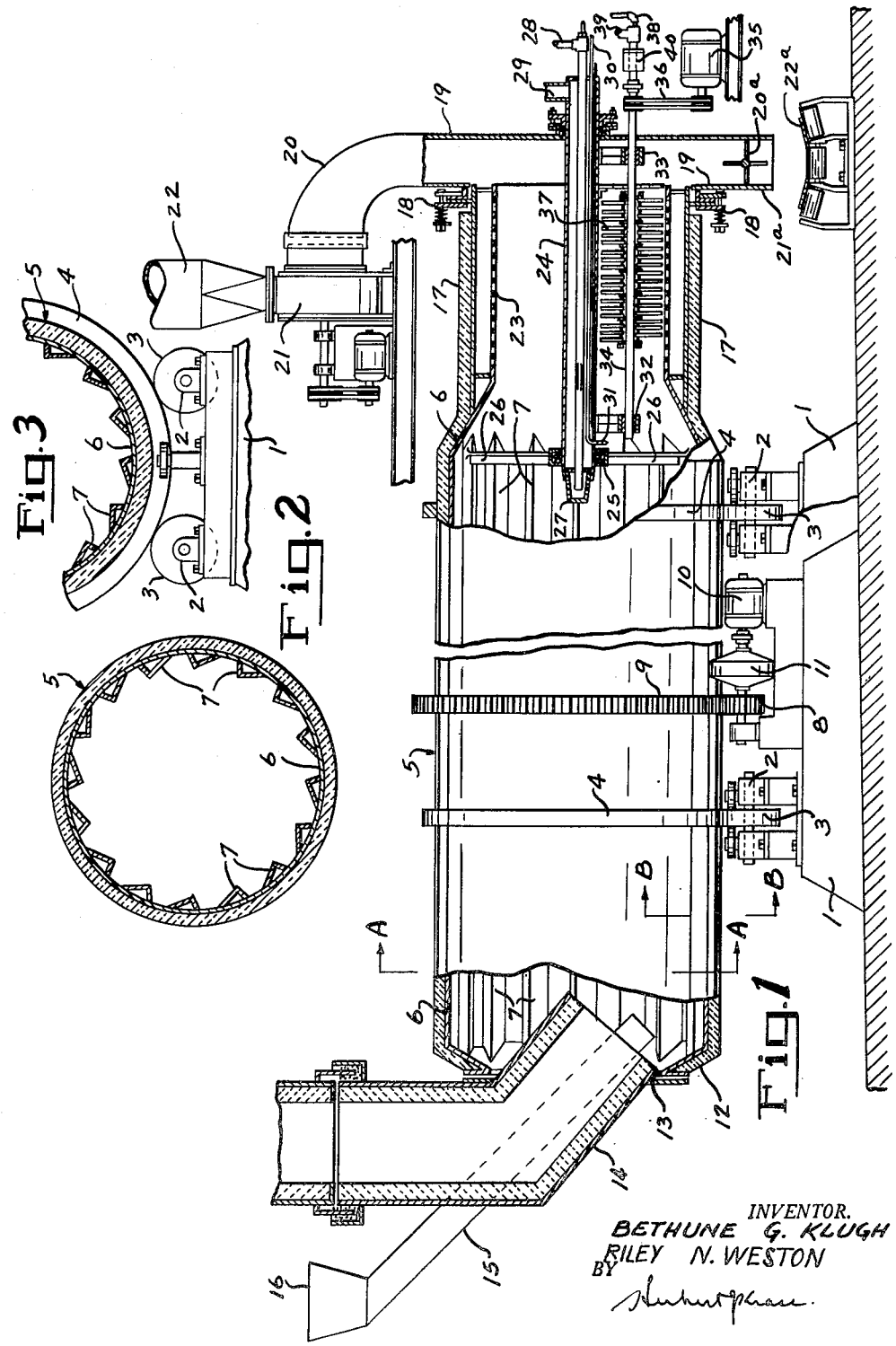
INVENTOR.
BETHUNE G. KLUGH
RILEY N. WESTON
BY

United States Patent Office 2,695,221
Patented Nov. 23, 1954

2,695,221

METHOD FOR FORMING AGGREGATES FROM AQUEOUS ORE SLURRIES

Bethune G. Klugh, deceased, Birmingham, Ala., and Riley N. Weston, Columbia, Tenn., assignors to Monsanto Chemical Company, St. Louis, Mo., a corporation of Delaware Application May 26, 1950, Serial No. 164,322

5 Claims. (Cl. 23—313)

This invention provides a method and apparatus for forming aggregates from ore slurries.

The primary object of this invention is to provide an improved method by which aggregates containing minerals and carbonaceous materials may be produced.

A further object is to provide a method by which aggregates suitable for further processing, e. g., briquetting and/or furnacing may be provided of constant and homogeneous mineral and carbonaceous material content.

A still further object is to provide an apparatus by which homogeneous aggregates of mineral and carbonaceous content may be produced in a continuous manner.

The ores or minerals which may be treated by the herein-described invention may be minerals containing phosphatic values or metalliferrous values, the latter including iron, silicon, aluminum, calcium titanium, tungsten, chromium, vanadium, boron, manganese, zirconium and the like. The mineral carbonaceous aggregates may be employed in the reductive smelting and recovery of phosphorus, calcium-carbide, ferrosilicon, ferroaluminum silicon, calcium silicon, calcium aluminum silicon, fused alumina, silicon carbide, ferrotitanium, ferrotungsten, ferroboron, ferrovanadium, ferromanganese, ferrozirconium and the like. In the process for producing the above products, the metallurgical operation involves, in each case, a high temperature smelting of the minerals in the presence of carbon.

By reason of the uniform, non-segregable character of the aggregates produced by the present invention, the recovery of the mineral values is rendered more efficient and in all cases has been found to take place with lower temperatures and with a smaller expenditure of thermal energy.

The aggregates produced by the present process may be further treated directly by the process described and claimed in our copending application Serial No. 108,466, filed August 4, 1949, now U. S. Patent No. 2,675,307, which application is assigned to the same assignee as is the present case. In the said pending application, a process is described wherein aggregates containing mineral matter and carbon in the form of bituminous coal are subjected to indirect heat while in the form of a vertical downwardly moving column while passing non-oxidizing gases upwardly through the said column.

The aggregates may also, prior to treatment by the process described and claimed in said above-mentioned copending application, be briquetted by means of briquetting rolls which are described and claimed in application Serial No. 100,628, filed June 22, 1949 in the name of Bethume G. Klugh and George C. Perrine, now U. S. Patent No. 2,662,246 which application is also assigned to the same assignee as is the present case. The present invention is uniquely adapted to the production of an aggregated briquette feed material useful by reason of the controlled presence therein of a definite amount of water for the formation of strong and uniform briquettes.

The efficient metallurgical treatment of minerals for the recovery of values therein requires that the unit aggregate contain mineral matter, fluxing constituents, if necessary, and carbonaceous reducing agents all in finely divided form of less than 60 mesh ultimate particle size, the particles thereof being in intimate contact with each other in said aggregate. The components of the aggregate are initially comminuted by a wet-grinding process so as to produce a free flowing slurry containing from 30% to 40% by weight of water. The components of the slurry may be ground separately, each in the form of a slurry, and the slurries thus produced may then be combined prior to treatment by our present invention. On the other hand, if desired, the mineral components and carbonaceous material, e. g., bituminous coal, may be combined prior to grinding and the mixture ground to the desired particle size for treatment herein. A preferred method and apparatus by which such grinding may be accomplished is described and claimed in copending application entitled "Wet-Grinding Method and Apparatus" by Bethune G. Klugh, Serial No. 164,321, filed May 26, 1950, which application is assigned to the same assignee as is the present case.

The present invention will be illustrated by reference to the accompanying drawings showing our improved apparatus as applied to the preparation of a phosphorus furnace smelting burden suitable, after drying and briquetting followed by calcination, for use in electro-thermal smelting for the production of phosphorus.

Reference is made to the drawings in which Fig. 1 is a view, partly sectional, of the rotary cylinder or drum. Fig. 2 shows a sectional view of the cylinder or drum taken at section A—A in Fig. 1. Fig. 3 shows a sectional view taken at section B—B, illustrating the supporting means for the cylinder.

In Fig. 1, foundation 1 supports bearings 2, carrying shafted rollers 3, which in turn support tires 4, arranged concentrically about insulated cylindrical drum 5, containing inner steel shell 6. Longitudinally arranged along the interior of shell 6 are flights 7. Drive pinion 8 meshes with ring gear 9, the former being rotated by means of motor 10 connected therewith through reduction gear 11.

The feed end 12 of cylinder 5 is provided with a feed opening 13 of somewhat reduced diameter, through which is inserted gas conduit 14 and a slurry feed pipe 15, which latter is provided with feed hopper 16.

The discharge end of the cylinder 6 is provided with a reduced diameter section 17 at the extremity of which is arranged gas tight ring seal means 18. The ring seal means is carried by gas discharge housing 19 joining with conduit 20, which in turn is connected with motor driven exhaust fan 21, discharging into stack 22. The lower part of gas discharge housing 19 is provided with a rotatable solids discharge wheel 20a housed in conduit 21a. Solid aggregated material discharging from the end of conduit 21a falls upon belt conveyor 22a, by which it may be conveyed to point of use.

Interiorly of the reduced diameter section 17 there is arranged annular screen 23, the perforations of which are so chosen as to pass the product of desired particle size.

Centrally located within reduced discharge section 17 is a tube 24, which is non-rotatable, the outboard end of which is supported by gas discharge housing 19 and the inboard end of which is supported by bearing 25 carried by spokes 26, which spokes are in turn fastened to the interior of shell 6. The inboard end of tube 24 is provided with a refractory burner head 27 containing flame ports. Combustible heating gas such as natural gas may be supplied to the burner through pipe 28, while air for combustion of said gas is supplied to pipe 24 at port 29. Within pipe 24 is also located water supply pipe 30 terminating in spray nozzle 31.

Supported by pipe 24 and rotating in bearings 32 and 33 which depend therefrom is shaft 34. The said shaft 34 is driven by motor 35 and belt means 36. Carried by shaft 34 are a series of swing hammers 37, arranged so as to swing freely in the space between pipe 24 and screen 23. Preferably the hammers are of such length as to permit particles of the desired size to pass between the ends of the hammers and the screen 23.

Since shaft 34 and bearings 32 and 33 are exposed to high temperatures, the shaft 34 is preferably fabricated from tubing and supplied interiorly with cooling water. Pipe connections 38 and 39 are provided for said introducing cooling water into tubular shaft 34, pipe 38 being somewhat smaller than the internal diameter of the tubular shaft 34 and at the same time extending into the tube 34 as far as bearing 32. Connection 40 is a conventional means for providing a water-tight connection between stationary pipes 38 and 39 and rotary shaft 34.

Our method, as described above, can be operated continuously without interruption for long periods of time when employing ore slurries of uniform consistency. When, however, a change is made in the type of ore slurry treated some time may elapse in making a readjustment to the conditions so as to obtain uniform optimum size and moisture content of the final aggregated product. In order to more readily ascertain and provide the correct conditions for operating and controlling the present process we have provided a source of auxiliary heat by means of gas burner 27 on the end of pipe 24. We have also provided a means for the supplying of water into the interior of the drum 6 in order to correct temporary conditions resulting from the over-evaporation of water in the drum. Such water is supplied to the interior of drum 6 by means of pipe 30 connected to spray nozzle 31. It is thus possible to quickly readjust conditions by these auxiliary means so that uniform aggregates may be produced without interruption of operations.

Naturally occurring phosphatic ores, sufficient silica to flux the lime present in the ore and bituminous coal are first comminuted by wet-grinding to produce a slurry in which the particles are less than 60 mesh size and which slurry contains from 30% to 40% by weight of water. The slurry so obtained is supplied to hopper 16, whereupon it flows through pipe 15 into the feed end of drum 6 at such a rate as to form a slurry pool near the inlet end of said drum. The depth of the slurry pool so formed should be maintained at from ⅙ to ¼ of the drum diameter. Simultaneously with the controlled feed of slurry, a stream of hot gases is directed onto the surface of the slurry pool. The relative rate of the slurry supply to the pool in the drum and the evaporative effect of the high temperature gases impinging thereon are maintained so that a pasty mass of material is formed, lifted by flights 7 and is moved forward continuously toward the discharge end of the drum. The progressive dewatering of the material with formation of a pasty mass of gradually increasing dryness has been found to form its own dam within the cylinder, the position of the dam usually being from ¼ to ⅓ of the length of the cylinder as measured from the feed end. With proper control, the evaporative effect of the hot gases, the slurry feed rate, the combined effects of heating and rotation, the latter by reason of successive lifting upwards upon the flight 7 and rolling backwards of the pasty lumps, causes the material to agglomerate into aggregates without segregation of the components thereof.

Continued passage of the initially formed lumps through the rotating cylinder, concurrent to the introduced hot gases causes a further gradual drying out and hardening of the lumps. When the agglomerates reach the end of the cylinder, they are sufficiently solid and hard so as to hold their shape and to pass onto screen section 23, which is attached to cylinder 6. In this screening section the agglomerates which are of the desired size, for example, minus ⅜ inch diameter, fall through the screen into the annular space between drum 17 and screen 23. They then pass out into the lower end of discharge conduit 19 through rotary valve 29 and onto belt 22. We have found that under optimum conditions of operation, most of the particles obtained by the herein-described process will be of such size as to readily pass through the ⅜ inch screen. However, due to irregularities in operating conditions, particularly a variation in the evaporative effect of the heated gases, some particles may be of larger size. These large sized particles are subjected to the action of swing hammers or cutters 37 arranged tangentially to above-mentioned screen 23 as described. The cutting action of the swing hammers serves to reduce the larger lumps to a size sufficiently small so as to pass through the aforementioned screen.

The cutters are arranged so as to effect a cutting or peeling of the outer surfaces of the oversize lumps which during such action are rolling downwardly towards the rotating cutter 37, thus causing a uniform peeling or shearing off of the outside layer of the lump to take place. The material removed from the outer surface of the lump has a moisture content of from 10% to 15% and is of such size as to readily pass through the screen. The interior layer of the lump has a moisture content which is greater than that of the outer layer. Upon removal of the outer layer, the inner layers of high moisture content are exposed to the evaporative effect of the gases and the moisture content is reduced. As a result of the combined action of the cutters and the drying gases, the lumps are gradually and uniformly reduced in size so that they eventually all pass through the screen as a material of substantially uniform moisture content having about 10% to 15% of free water.

The finer material which is sheared off of the lumps by the cutters, is, due to the rotative action of the drum caused to agglomerate in the annular space between drum 17 and screen 23, forming aggregates of the desired size and moisture content.

The aggregated product so obtained will, as has been stated, contain from 10% to 15% of free moisture, the particles being of sufficient strength to withstand further handling such as may be involved in treatment either by way of calcination or briquetting followed by calcination as may be desired.

The movement of the hot gases through the drum is so controlled as to maintain the exit temperature in housing 19 between about 175° F. and 200° F. The hot gases and the steam are removed from the discharge end of the drum by the action of fan 21 and discharged into stack 22.

What we claim is:

1. Apparatus for forming sized aggregates from finely divided mineral matter-containing slurries comprising a rotatively mounted horizontally disposed cylindrical shell having a feed end and a discharge end, said feed end being provided with means for admitting an aqueous slurry and also hot gases to the interior of said shell, said discharge end being provided with a concentric screen interiorly mounted therein and of diameter less than that of the interior of said cylindrical shell and rotatively mounted swing hammers adjacent and within said screen and tangentially arranged therein but not contacting the interior of said screen.

2. Apparatus for forming sized aggregates from finely divided mineral matter-containing aqueous slurries comprising a rotatively mounted horizontally disposed cylindrical shell having a feed end and a discharge end, said feed end being provided with inlet means for admitting aqueous slurry and also for admitting hot gases to the interior of said shell, said discharge end being provided with a concentric screen section interiorly mounted therein and of diameter less than that of the interior of said cylindrical shell, rotatively mounted swing hammers adjacent and within said screen section and tangentially arranged therein but not in contact with the interior of said screen.

3. Apparatus for forming sized aggregates from finely divided mineral matter-containing aqueous slurries comprising a rotatively mounted horizontally disposed cylindrical shell having a feed end and a discharge end, said feed end being provided with inlet means for admitting aqueous slurry and also for admitting hot gases to the interior of said shell, said discharge end being provided with a reduced diameter concentric screen section interiorly mounted therein, a centrally located non-rotative gas conduit positioned within said screen section, and rotatively mounted swing hammers adjacent said screen section and tangentially arranged therein but not in contact with the interior surface of said screen said swing hammers being supported from said non-rotative gas conduit.

4. A method for converting a slurry of finely-divided mineral solids and carbonaceous material into aggregates of homogeneous composition which comprises providing an aqueous slurry containing mineral and carbonaceous particles of less than 60 mesh size, said slurry containing an amount of water in excess of 30% by weight but not in excess of 40% by weight thereof, forming a pool of said slurry in a horizontally disposed cylindrical zone and impinging upon the surface of the said pool a current of high temperature gases whereby water is evaporated from said slurry, subjecting said slurry to a rolling motion interiorly of said circular cylindrical zone whereby lumpy aggregates having a plurality of sizes are formed from said slurry and rolling said aggregates upon each other while evaporating water therefrom, separating the finer from the larger sizes of said aggregates, subjecting the larger sizes of said aggregates to a simultaneous shearing and drying process in said zone while flowing in concurrent flow relationship with respect to said gases, whereby the said larger sizes are reduced in size and moisture content to that of said smaller size aggregates fraction, the moisture content of said aggregates being not in excess of 15% by weight.

5. The method for converting the slurry of finely-divided phosphatic mineral and carbonaceous material into aggregates of homogeneous composition which comprises providing an aqueous slurry containing mineral phosphatic and carbonaceous particles of less than 60 mesh size, said slurry containing an amount of water in excess of 30% but not in excess of 40% by weight thereof, forming a pool of said slurry in a horizontally disposed cylindrical zone and impinging upon the surface of said pool a current of high temperature gases whereby water is evaporated from said slurry, subjecting said slurry simultaneously to a rolling motion interiorly of said circular cylindrical zone whereby lumpy aggregates having a plurality of sizes are formed from said slurry, rolling said aggregates upon each other while evaporating water therefrom, separating the finer from the larger sizes of said aggregates, subjecting the larger sizes of said aggregates to a simultaneous shearing and drying process in said zone while flowing in concurrent flow relationship with respect to said gases, whereby the said larger sizes are reduced in size and moisture content to approximately that of said smaller sizes, the moisture content of said aggregates being not in excess of 15% by weight.

References Cited in the file of this patent

UNITED STATES PATENTS

| Number | Name | Date |
|---|---|---|
| 255,890 | Sharpneck | Apr. 4, 1882 |
| 561,744 | Witmer | June 9, 1896 |
| 708,946 | Welch | Sept. 9, 1902 |
| 788,675 | Rissmuller | May 2, 1905 |
| 927,054 | Knecht | July 6, 1909 |
| 1,614,364 | Hidoux | Jan. 11, 1927 |
| 1,627,585 | Vogel-Jorgensen | May 10, 1927 |
| 1,735,396 | Hiller | Nov. 12, 1929 |
| 1,735,397 | Hiller | Nov. 12, 1929 |
| 1,921,114 | Brackelsburg | Aug. 8, 1933 |
| 1,980,130 | Fasting | Nov. 6, 1934 |
| 2,029,309 | Curtis | Feb. 4, 1936 |
| 2,297,300 | Hardesty | Sept. 29, 1942 |
| 2,311,154 | Carney | Feb. 16, 1943 |
| 2,347,402 | Day | Apr. 25, 1944 |
| 2,443,462 | Kimberlin et al. | June 15, 1948 |
| 2,448,126 | Shoeld | Aug. 31, 1948 |
| 2,460,008 | Heller | Jan. 25, 1949 |
| 2,479,389 | Maust et al. | Aug. 16, 1949 |